United States Patent
Chang et al.

(10) Patent No.: US 9,971,430 B2
(45) Date of Patent: May 15, 2018

(54) TOUCH PANEL

(71) Applicants: TPK Touch Systems (Xiamen) Inc., Xiamen (CN); TPK Touch Solutions (Xiamen) Inc., Xiamen (CN)

(72) Inventors: Pu-Hsin Chang, Taichung (TW); Jui-Hsing Li, Taoyuan (TW); Fucheng Chen, Xiamen (CN); Manyi Lin, Zhangzhou (CN); Pudi Hong, Xiamen (CN); Tsai-Kuai Wei, Hsinchu (TW); Xiaoxin Bai, Xiamen (CN); Caijin Ye, Xiamen (CN); Defa Wu, Jinjiang (CN)

(73) Assignees: TPK Touch Systems (XIAMEN) Inc, Xiamen (CN); TPK Touch Solutions (Xiamen) Inc, Xiamen (CN)

( * ) Notice: Subject to any disclaimer, the term of this patent is extended or adjusted under 35 U.S.C. 154(b) by 0 days. days.

(21) Appl. No.: 14/636,110

(22) Filed: Mar. 2, 2015

(65) Prior Publication Data
US 2015/0253888 A1 Sep. 10, 2015

(30) Foreign Application Priority Data
Mar. 6, 2014 (CN) .......................... 2014 1 0079974

(51) Int. Cl.
*G06F 3/041* (2006.01)
(52) U.S. Cl.
CPC .... *G06F 3/041* (2013.01); *G06F 2203/04103* (2013.01); *G06F 2203/04113* (2013.01)

(58) Field of Classification Search
CPC ......... G06F 2203/04103; G06F 3/0416; G06F 1/16; G06F 3/047; G06F 3/041
See application file for complete search history.

(56) References Cited

U.S. PATENT DOCUMENTS

| | | | | |
|---|---|---|---|---|
| 8,963,877 | B2* | 2/2015 | Lim | G06F 3/044 178/18.06 |
| 2011/0267284 | A1* | 11/2011 | Lee | G06F 3/041 345/173 |
| 2013/0140061 | A1* | 6/2013 | Lim | G06F 3/044 174/255 |
| 2014/0084992 | A1* | 3/2014 | Chen | G06F 3/0412 327/517 |
| 2014/0098055 | A1* | 4/2014 | Choi | G06F 3/0416 345/174 |
| 2014/0139445 | A1* | 5/2014 | Chen | G06F 3/041 345/173 |
| 2014/0203703 | A1* | 7/2014 | Maatta | H01L 23/3121 313/504 |
| 2014/0254111 | A1* | 9/2014 | Yamazaki | H01L 51/0097 361/749 |
| 2015/0169092 | A1* | 6/2015 | Lee | G06F 3/041 345/173 |

\* cited by examiner

*Primary Examiner* — Kent Chang
*Assistant Examiner* — Scott Au
(74) *Attorney, Agent, or Firm* — Paul David Bendemire (57) ABSTRACT

A touch panel comprises a sensing area, a periphery area, a plurality of wires and a plurality of bonding pads. The periphery area is disposed around the sensing area. The periphery area comprises a bonding area. The wires are disposed in the periphery area. The bonding pads are disposed in the bonding area and electrical connected to the wires correspondingly. Each of the bonding pads comprises at least a bending portion.

12 Claims, 7 Drawing Sheets

TOUCH PANEL

BACKGROUND OF THE DISCLOSURE

This Application claims priority of the People's Republic of China Patent Application No. CN 201410079974.3, filed on Mar. 6, 2014, the entirety of which is incorporated by reference herein.

Field of the Disclosure

The present disclosure relates to touch technology, and more particularly, to a touch panel.

Description of the Related Art

With the progress of technology, touch control applications, such as ATMs, electronic ticketing systems, information query systems or access and recognition systems, and even portable electronic devices (e.g. smartphones, tablet computers or notebook computers), have become a very normal part of human life. For each of the above products, the size of the touch display screen affects comfort of the user's viewing experience.

However, the larger the size of the screen, the larger size of the whole device. For portable electronic devices, device size directly affects ergonomics of the device in the user's hand.

SUMMARY OF THE DISCLOSURE

In view of the foregoing subject, the present disclosure provides a touch panel whereby the screen's size can be increased while the size of the whole device is not increased.

According to an embodiment, a touch panel comprises a sensing area, a periphery area, a plurality of wires and a plurality of bonding pads. The periphery area is disposed around the sensing area. The periphery area comprises a bonding area. The wires are disposed in the periphery area. The bonding pads are disposed in the bonding area and electrical connected to the wires correspondingly. Each of the bonding pads comprises at least a bending portion.

According to an embodiment, a touch panel comprises a sensing area, a periphery area, a plurality of wires and a plurality of bonding pads. The periphery area is disposed around the sensing area. The periphery area comprises a bonding area. The wires are disposed in the periphery area. The bonding pads are disposed in the bonding area and electrical connected to the wires correspondingly. An extension line of each of the wires and an edge of the sensing area adjacent to the bonding area form an obtuse angle.

According to an embodiment, a touch panel comprises a sensing area, a periphery area, a plurality of wires and a plurality of bonding pads. The periphery area is disposed around the sensing area. The periphery area comprises a bonding area. The wires are disposed in the periphery area. The bonding pads are disposed in the bonding area and electrical connected to the wires correspondingly. An extension line of each of the bonding pads and an edge of the sensing area adjacent to the bonding area form an obtuse angle.

In one embodiment, the bonding pad comprises a plurality of bending portions.

In one embodiment, at least a part of the bonding pads are disposed symmetrically.

In one embodiment, the touch panel further comprises a circuit board which is correspondingly attached to the bonding pads in the bonding area.

As mentioned above, in the touch panel of this disclosure, the bonding pad comprises a bending portion or obliquely connects to the wire, and therefore the area of the peripheral area can be reduced and the purpose of the narrow border can be achieved. Besides, in some embodiments, the bending portion design of the bonding pad can enhance the adhesion between the bonding pad and the circuit board and thus avoid the break and separation between the circuit board and the bonding pad.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE EMBODIMENTS

The present disclosure will be apparent from the following detailed description, which proceeds with reference to the accompanying drawings, wherein the same references relate to the same elements.

Figure 1:
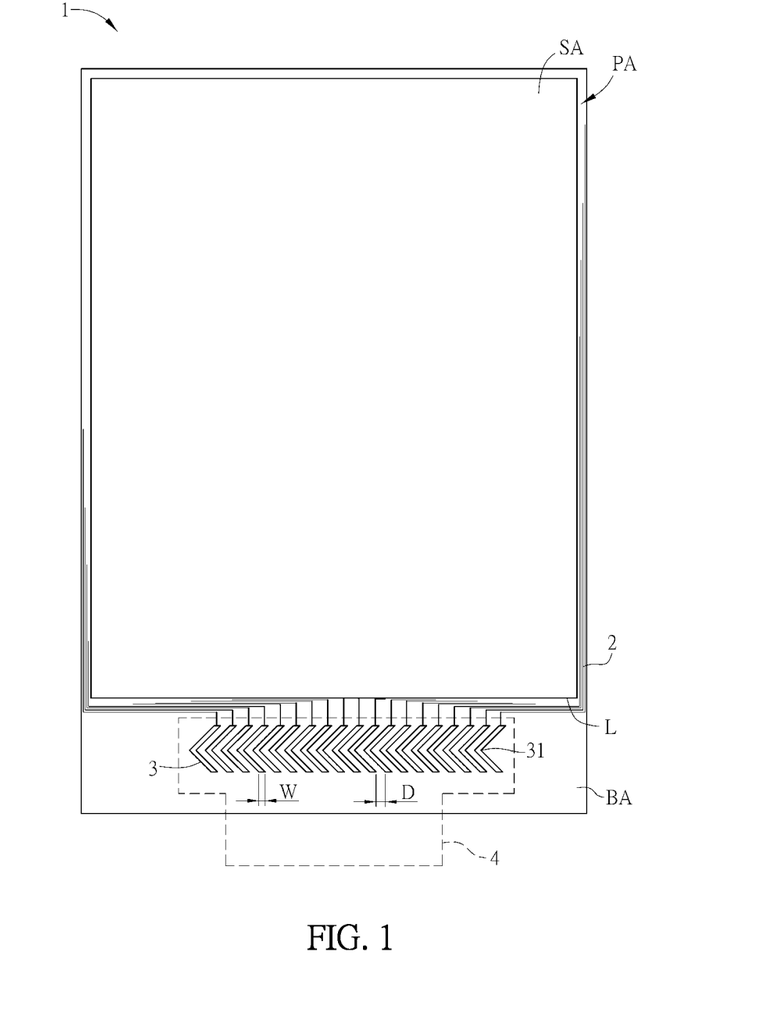
FIG. 1 is a schematic diagram of a touch panel 1 of an embodiment of the disclosure.

FIG. 1 is a schematic diagram of a touch panel 1 of an embodiment of the disclosure. As shown in FIG. 1, the touch panel 1 comprises a sensing area SA, a peripheral area PA, a plurality of wires 2 and a plurality of bonding pads 3. In some embodiments, the touch panel 1 uses resistive, capacitive, optical or another type of touch technology. Moreover, the so-called "touch panel" herein can comprise a touch panel or a touch display panel. For purposes of clear illustration of the touch panel 1, detailed structure and composition of the sensing area SA are not shown in FIG. 1.

The peripheral area PA is disposed around the sensing area SA, and that is, the peripheral area PA can be disposed on at least one side of the sensing area SA. The peripheral area PA comprises a bonding area BA. In some embodiments, the sensing area SA has quadrangular shape, the peripheral area PA is disposed around the sensing area SA, and the bonding area BA is disposed in the peripheral area PA and on one side of the sensing area SA. The sensing area SA has an edge L adjacent to the bonding area BA. In some embodiments, the peripheral area PA is disposed on one side of the sensing area SA or on two opposite sides of the sensing area SA, but the peripheral area PA can be disposed in other ways according to various requirements.

The wires 2 are disposed in the peripheral area PA and are gathered to the bonding area BA by layout design. The wires 2 are electrically connected to sensing elements (not shown) in the sensing area SA so that sensing signals generated by the sensing elements in the sensing area SA are transmitted to a circuit board 4 through the wires 2. Herein, the bonding area BA is the area for the connection of the wires 2 with the circuit board 4, and the circuit board 4 is correspondingly attached to the bonding pads 3 in the bonding area BA.

The bonding pads 3 are disposed in the bonding area BA and electrically connected to the wires 2 correspondingly. In some embodiments, the bonding pads 3 are disposed separately and insulated from each other electrically. The bonding pads 3 include molybdenum, aluminum, copper, gold, silver or any combination thereof, for example, and employ a multi-layer structure in some embodiments. The material of the bonding pads 3 is not limited in this disclosure, as long as the bonding pads 3 can electrically connect the wires 2 and the circuit board 4 in a secure fashion.

Each bonding pad 3 comprises a bending portion 31. The so-called "bending portion" herein can encompass a curved bending portion or a bending portion with an angle. In some embodiments, each of the bonding pads 3 comprises a bending portion 31, and the adjacent two bonding pads 3 have an interval D. In other embodiments, the bonding pad 3 may comprise two or more bending portions 31. Accordingly, on condition that the width W of the bonding pad 3 is fixed and the total area of the contact between the bonding pads 3 and the circuit board 4 is constant, in comparison with other approaches where the bonding pad is without the bending portion, this configuration reduces the length of the bonding pad 3 along the direction perpendicular to the edge L by the bending portion design. The area of the peripheral area PA is reduced. The purpose of the narrow border can be achieved and the viewable area of the screen (corresponding to the sensing area SA) can be maximized on the premise that the size of the touch panel is not increased.

Furthermore, the bending portion design also increases the attachment area between the circuit board 4 and the bonding pads 3 in a unit area, so as to enhance the adhesion therebetween. Additionally, when the circuit board 4 is pulled by an external force, the bending portion design can distribute the stress to avoid breakage and separation between the circuit board 4 and bonding pads 3. Larger width W of the bonding pad 3 and smaller interval D both increase adhesion between the bonding pads 3 and the circuit board 4.

Figure 2:
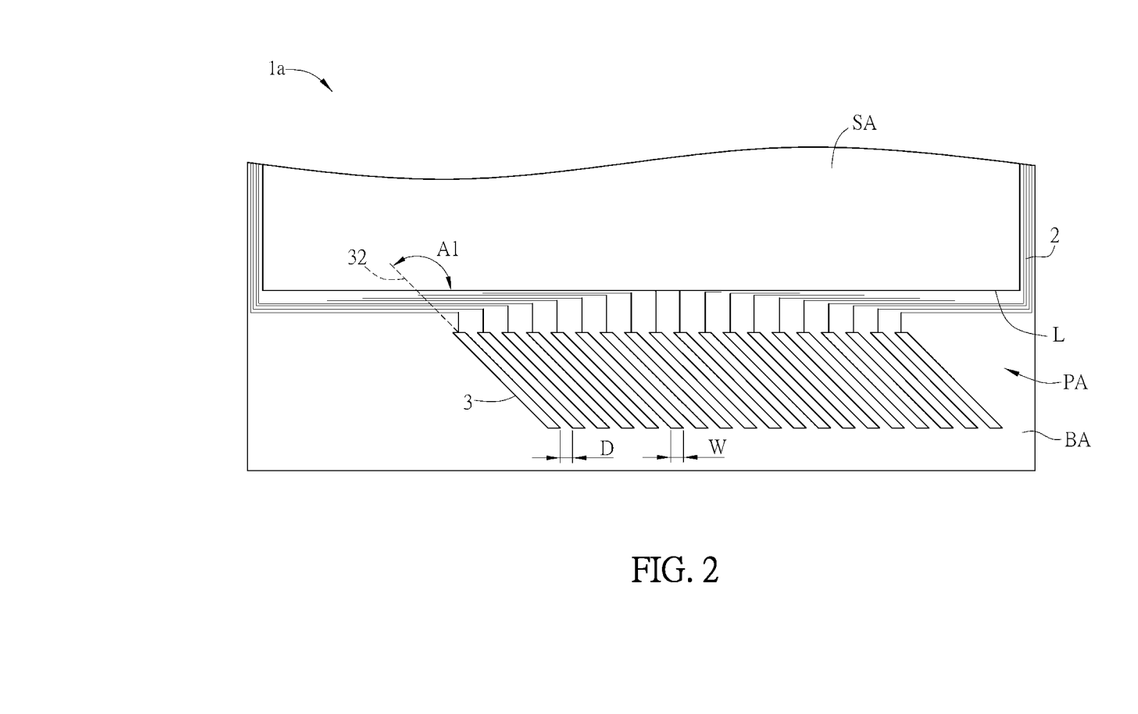
FIG. 2 is a schematic diagram of a part of a touch panel 1a of another embodiment of the disclosure.

FIG. 2 is a schematic diagram of a part of a touch panel 1a in accordance with various embodiments of the disclosure. As shown in FIG. 2, an extension line 32 of each of the bonding pads 3 of the touch panel 1a and an edge L of a sensing area SA adjacent to a bonding area BA form an obtuse angle A1. In detail, the extension line 32 of the bonding pad 3 is extended towards the edge L from the bonding pad 3 and forms an obtuse angle A1 with the edge L after intersecting the edge L. That is, in some embodiments, the bonding pad 3 obliquely connects to the wire 2 and the wire 2 is perpendicular to the edge L. Accordingly, the bonding pad 3 and the wire 2 are not disposed collinearly but connected to each other at an angle. In comparison with other approaches where the bonding pad has no inclined angle, the extension line 32 of the bonding pad 3 and the edge L of the sensing area SA adjacent to the bonding area BA form the obtuse angle A1. For the same length of the bonding pad 3, the length of the bonding pad 3 along the direction perpendicular to the edge L is reduced. The area of the peripheral area PA is reduced and achieves the purpose of the narrow border. The touch panel 1a is similar to the touch panel 1 of FIG. 1, so description of the touch panel 1a is omitted here for conciseness.

Figure 3A:
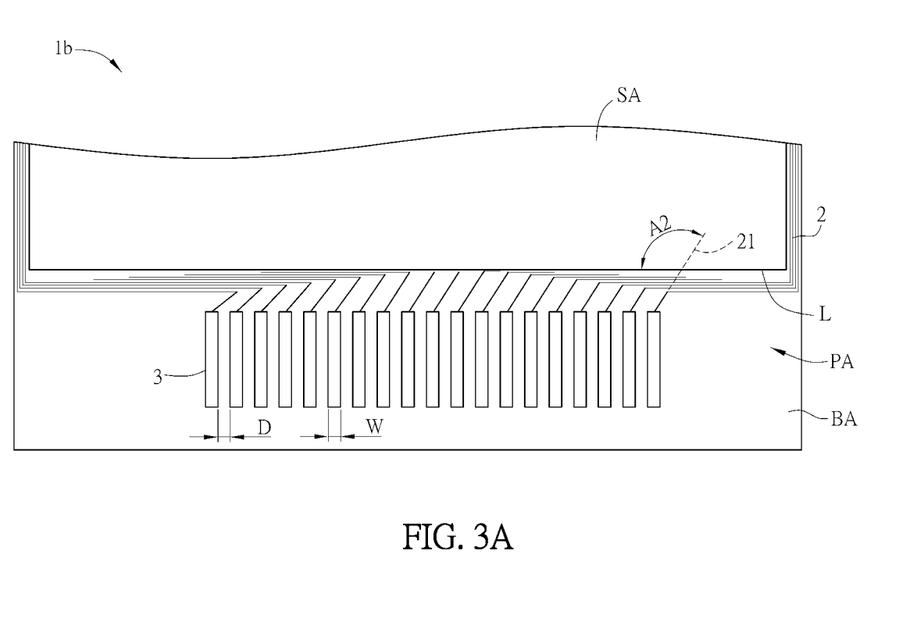
FIG. 3A is a schematic diagram of a part of a touch panel 1b of another embodiment of the disclosure.
Figure 3B:
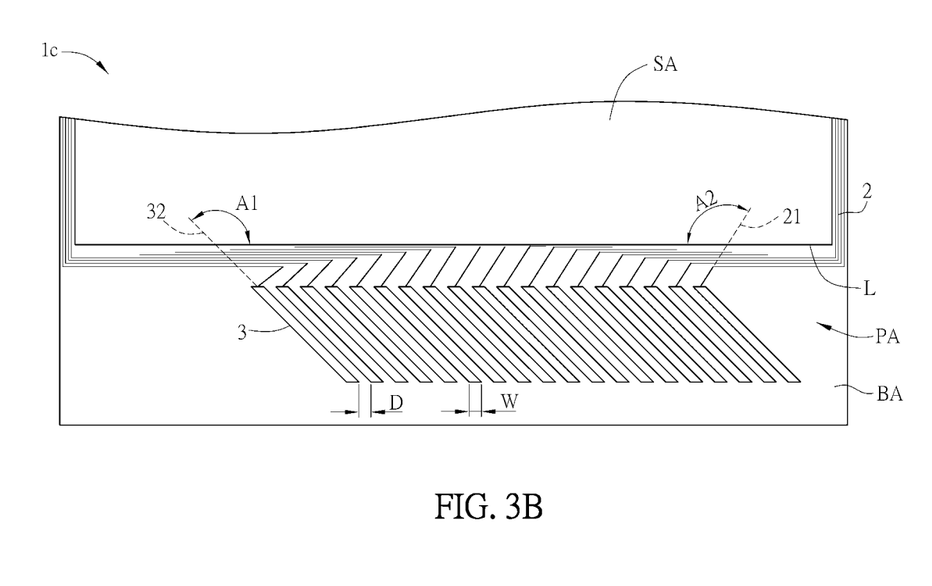
FIG. 3B is a schematic diagram of a part of a touch panel 1c of another embodiment of the disclosure.

FIG. 3A is a schematic diagram of a part of a touch panel 1b in accordance with various embodiments of the disclosure. As shown in FIG. 3A, an extension line 21 of each of the wires 2 of the touch panel 1b and the edge L of the sensing area SA adjacent to the bonding area BA form an obtuse angle A2. In detail, the extension line 21 of the wire 2 is extended towards the edge L from the wire 2 and forms an obtuse angle A2 with the edge L after intersecting the edge L. The main difference from the above configuration is that the wire 2 obliquely connects to the bonding pad 3 and the bonding pad 3 is perpendicular to the edge L. Accordingly, the distance from the wire 2 to the bonding pad 3 along the direction perpendicular to the edge L is reduced to reduce the area of the peripheral area PA and thus to achieve the purpose of the narrow border. Likewise, in some embodiments, the wire 2 and the bonding pad 3 connect to each other both obliquely, such as in the touch panel 1c shown in FIG. 3B. In this case, the extension line 32 of the bonding pad 3 and the edge L of the sensing area SA adjacent to he bonding area BA form the obtuse angle A1 while the extension line 21 of the wire 2 and the edge L of the sensing area SA adjacent to the bonding area BA form the obtuse angle A2. The descriptions of the touch panels 1b and 1c can be comprehended by referring to the above description, and therefore are omitted here for conciseness.

Figure 4:
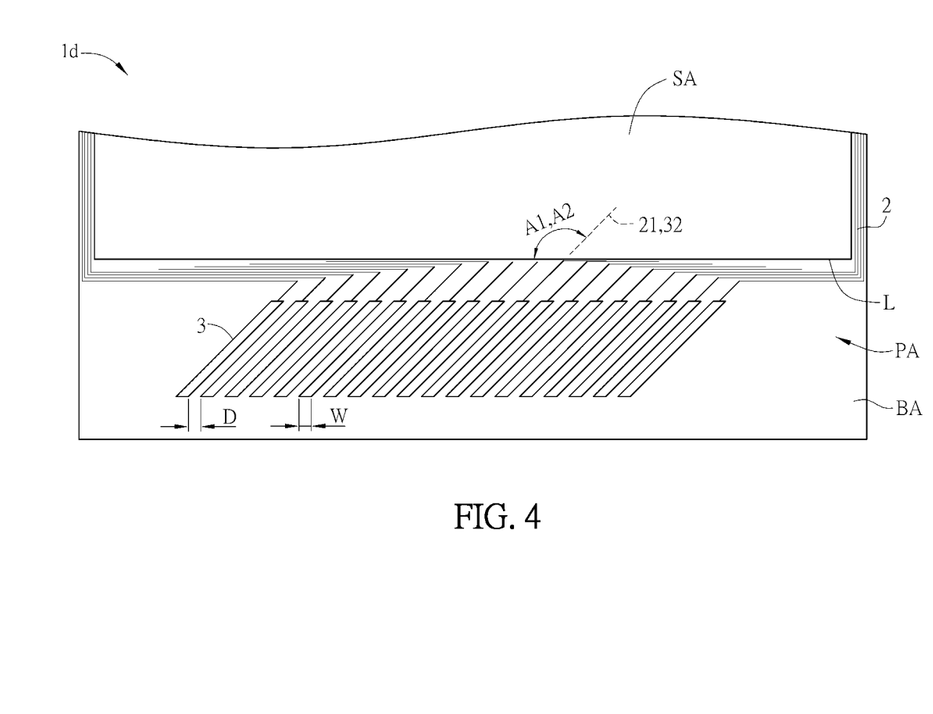
FIG. 4 is a schematic diagram of a part of a touch panel 1d of another embodiment of the disclosure.
Figure 5A:
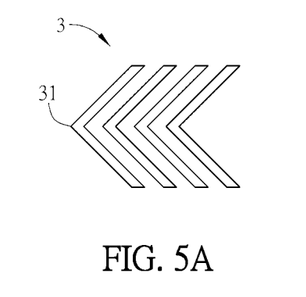
FIGS. 5A to 5H are schematic diagrams of some variations of the bonding pad of the touch panel of an embodiment of the disclosure.
Figure 5B:
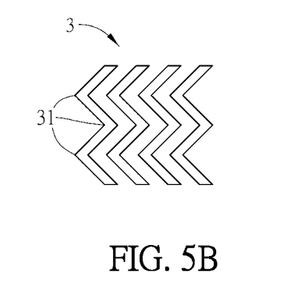
Figure 5C:
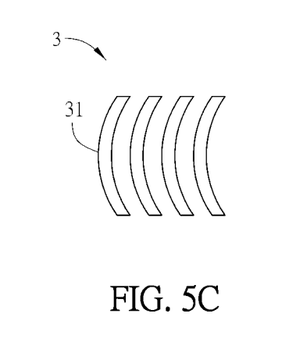
Figure 5D:
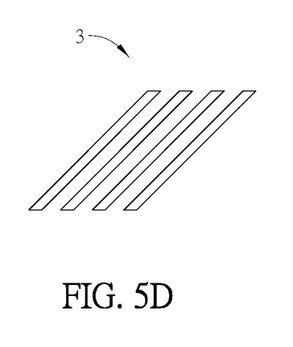
Figures 5E, 5F:
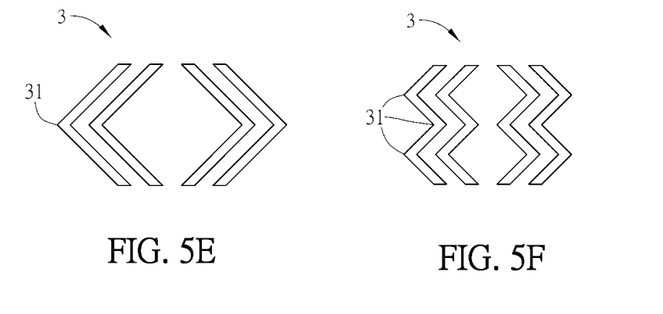
Figure 5G:
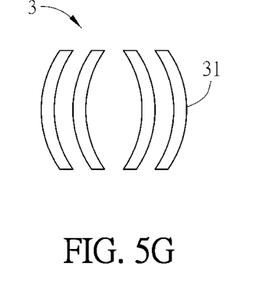
Figure 5H:
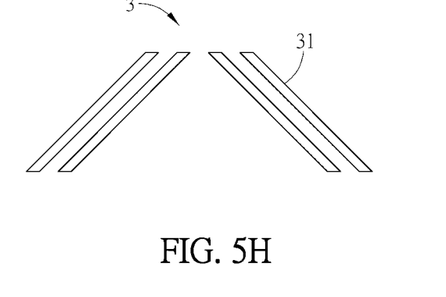

FIG. 4 is a schematic diagram of a part of a touch panel 1d in accordance with various embodiments of the disclosure. As shown in FIG. 4, the obtuse A1 formed between the extension line 32 of each of the bonding pads 3 and the edge L of the sensing area SA is the same as the obtuse angle A2 formed between the extension line 21 of each of the wires 2 and the edge L of the sensing area SA. In other words, the wire 2 and the bonding pad 3 are connected to each other collinearly and the extension lines 21, 32 are both not perpendicular to the edge L. Therefore, in comparison with conventional configurations in which the wire and the bonding pad have no inclined angle, the configuration of FIG. 4 reduces the width of the bonding area BA along the direction perpendicular to the edge L, so as to reduce the area of the peripheral area PA and thus achieve the purpose of the narrow border. The description of the touch panel 1d can be comprehended by referring to the above description, and therefore is omitted here for conciseness.

FIGS. 5A to 5H are schematic diagrams of some variations of the bonding pad 3 of the touch panel in accordance with various embodiments of the disclosure, and four bonding pads 3 are shown in each of the figures for example. In practice, the quantity of the bonding pads 3 can be changed according to the requirement. In FIGS. 5A to 5D, the bonding pad 3 comprises a bending portion 31, three bending portions 31, a bending portion 31 (curved) and an inclined form, respectively. Moreover, the bonding pads 3 shown in FIGS. 5E to 5H are variations of the bonding pads 3 in FIG. 5A to 5D changed into a symmetric form, respectively, which also achieves the purpose of the narrow border. In practice, the technical features of the above-mentioned embodiments can be selectively combined or used according to the requirement. For example, the bonding pad 3 can have a bending portion, a curved portion or an inclined form at the same time to achieve the narrow border effect.

Moreover, in other approaches, the copper-exposed region of the circuit board for connecting to the bonding pad is easily broken due to no protection layer thereon. However, through the design of the above embodiments, the length of the bonding pad 3 along the direction perpendicular to the edge L is reduced, so that the copper-exposed region also has a shorter length along the direction perpendicular to the edge L, and therefore the probability that the copper-exposed region of the circuit board 4 is broken can be reduced. To be noted, the so-called "copper-exposed region" herein indicates the electrical conduction region of the circuit board for connecting the bonding pad, and therefore the conductive material of the circuit board is not limited to copper.

Moreover, the peripheral area PA can be configured with a mask layer to cover the wires, bonding pads 3 and circuit board 4 to achieve the purpose of a beautiful look.

Summarily, in the touch panel of this disclosure, the bonding pad comprises a bending portion or obliquely connects to the wire, and therefore the area of the peripheral area can be reduced and the purpose of the narrow border can be achieved. Besides, in some embodiments, the bending portion design of the bonding pad can enhance the adhesion between the bonding pad and the circuit board and thus avoid the break and separation between the circuit board and the bonding pad.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel, comprising:
    a sensing area;
    a peripheral area disposed around the sensing area and comprising a bonding area;
    a plurality of wires disposed in the peripheral area; and
    a plurality of bonding pads, each having a penetrating axis penetrating the bonding pad, disposed in the bonding area, wherein:
        each of the plurality of bonding pads is electrically connected to a corresponding wire of the plurality of wires, and
        the penetrating axes of the bonding pads are inclined in reference to an edge line of the sensing area adjacent to the bonding area;
        wherein an extension line of each of the plurality of wires and an edge line of the sensing area adjacent to the bonding area form an obtuse angle;
        wherein an obtuse angle formed between the penetrating axes of the plurality of bonding pads and the edge line of the sensing area and the obtuse angle formed between the extension line of each of the plurality of wires and the edge line of the sensing area are substantially equal.

2. The touch panel of claim 1, wherein each of the plurality of bonding pads comprises at least one bending portion.

3. The touch panel of claim 1, wherein, for each of the plurality of bonding pads, a first part of the bonding pad is substantially symmetrical with a second part of the bonding pad.

4. The touch panel of claim 1, further comprising:
    a circuit board correspondingly attached to the plurality of bonding pads in the bonding area.

5. The touch panel of claim 1, wherein at least one of the plurality of bonding pads comprises a curved portion.

6. The touch panel of claim 1, wherein at least one of the plurality of the bonding pads comprises an inclined form.

7. A touch panel, comprising:
    a sensing area;
    a peripheral area disposed around the sensing area and comprising a bonding area;
    a plurality of wires disposed in the peripheral area; and
    a plurality of bonding pads, each having a penetrating axis penetrating the bonding pad, disposed in the bonding area, wherein:
        each of the plurality of bonding pads is electrically connected to a corresponding wire of the plurality of wires, and
        the penetrating axes of the bonding pads are inclined in reference to an edge line of the sensing area adjacent to the bonding area;
        wherein an extension line of each of the plurality of wires and an edge line of the sensing area adjacent to the bonding area form an obtuse angle;
        wherein an obtuse angle formed between the penetrating axes of the plurality of bonding pads and the edge line of the sensing area is different from the obtuse angle formed between the extension line of each of the plurality of wires and the edge line of the sensing area.

8. The touch panel of claim 7, wherein each of the plurality of bonding pads comprises at least one bending portion.

9. The touch panel of claim 7, wherein, for each of the plurality of bonding pads, a first part of the bonding pad is substantially symmetrical with a second part of the bonding pad.

10. The touch panel of claim 7, further comprising:
    a circuit board correspondingly attached to the plurality of bonding pads in the bonding area.

11. The touch panel of claim 7, wherein at least one of the plurality of bonding pads comprises a curved portion.

12. The touch panel of claim 7, wherein at least one of the plurality of the bonding pads comprises an inclined form.

\* \* \* \* \*